United States Patent

[11] 3,593,373

[72] Inventor David G. Loomis
 217 Gypsy Lane, Wynnewood, Pa. 19096
[21] Appl. No. 776,844
[22] Filed Sept. 26, 1968
[45] Patented July 20, 1971
 Continuation-in-part of application Ser. No. 513,440, Dec. 13, 1965, now abandoned.

[54] MOLDING APPARATUS
 3 Claims, 8 Drawing Figs.
[52] U.S. Cl. .................................. 18/5 HA,
 18/DIG. 26, 18/DIG. 44, 18/DIG. 19, 25/45
[51] Int. Cl. ...................................... B30b 5/02,
 B30b 11/00
[50] Field of Search .......................... 25/45, 39;
 18/5, 5 H, DIG. 44, DIG. 26; 249/98, 100

[56] References Cited
 UNITED STATES PATENTS

| | | | |
|---|---|---|---|
| 2,863,205 | 12/1958 | Seaman et al. | 25/39 |
| 3,034,191 | 5/1962 | Schaefer et al. | 18/5 I UX |
| 3,114,956 | 12/1963 | Gannaway | 249/100 X |
| 3,124,857 | 3/1964 | Delisle | 249/100 |
| 3,161,936 | 12/1964 | Tiller | 25/39 |
| 3,172,153 | 3/1965 | Loomis et al. | 18/5 I |
| 3,193,900 | 7/1965 | Wendt | 18/5 I X |
| 3,206,822 | 9/1965 | Pausch | 18/39 |
| 3,341,910 | 9/1967 | Hesselholt | 25/39 |
| 3,454,997 | 7/1969 | Lignon et al. | 18/5 I UX |

Primary Examiner—J. Howard Flint, Jr.
Attorney—Charles Marks

ABSTRACT: Apparatus for dry pressing and isostatic pressing of ceramic powder to form pipe wherein a groove is provided near a pipe end by means of arcuate, metallic segments which are hydraulically pressed into the powder by flexible tooling. The adjacent portion of the pipe is formed by a punch.

INVENTOR.
DAVID G. LOOMIS
BY
Charles Marks
ATTORNEY 3,593,373

MOLDING APPARATUS

CROSS-REFERENCES TO RELATED APPLICATIONS

This application is a continuation-in-part of applicant's prior copending application bearing Ser. No. 513,440 filed Dec. 13, 1965 and thereafter abandoned.

BACKGROUND OF THE INVENTION

1. Field of the Invention

This invention relates generally to the art of compacting pelletized or powdered materials, such as ceramic or metallic pellets or powders, where the hydraulic pressure of a liquid, such as oil or water, is exerted upon a flexible bag enclosing the pelletized or powdered materials and serving as a mold. The invention is particularly concerned with an apparatus for molding pipe composed of clay or other ceramic substance.

2. Description of the Prior Art

Heretofore, pipe has been produced by pressing semidry mixtures of powdered or pelletized material in molds or bags composed of rubber, which are disposed in metal chambers and there subjected to high hydraulic pressure by means of suitable pumps. However, this method has encountered substantial difficulties where it has been desired to produce piping having annular grooves and other elements intended for service as part of a pipe joint such as that of bell and spigot piping. Thus, by conventional methods, it has been difficult to compact pipe having bell portions and annular grooves, such as O-ring grooves, formed to close tolerances. Moreover, it has also been difficult by conventional methods to compact pipe having very smoothly finished inside bores and requiring a minimum of subsequent finishing operations.

The present invention overcomes these difficulties. More specifically, it is an object of the present invention to provide means for forming annular grooves within close tolerances upon the external surface of a pipe spigot.

Another object of the invention is to provide a means for forming the internal surface of a pipe bell within close tolerances.

Another object of the invention is to provide a means for forming the elements of a bell and spigot pipe joint to close tolerances and thereby permit the production of pipe having joints of minimum size.

Another object of the invention is to provide means for forming pipe wherein a portion of the internal surface has a very smooth finish.

A further object of the invention is to provide means for compacting pipe wherein subsequent finishing operations can be minimized.

A still further object of the invention is to provide an improved and economical means for compacting sewer pipe.

Other objects and advantages of the present invention will become apparent from the following discussion as read in connection with the accompanying drawings.

SUMMARY OF THE INVENTION

In the present invention, a ceramic pipe is formed in a bag mold by simultaneous dry pressing and isostatic pressing of a suitable powder or pelletized material. An annular groove is provided on the external surface of the pipe by means of a segmented, retractable, arcuate die within said mold, the die being urged by hydraulic pressure into the surface of the pipe during the aforesaid pressing operation while the powdered or pelletized material is surmounted by a hard, metallic punch which forms an end face on the pipe. The tolerances of the annular groove, end face and adjacent surfaces are determined by the tolerances of the segmented die and punch.

BRIEF DESCRIPTION OF THE DRAWINGS

In the drawings.

Throughout the various views, similar numerals are employed to designate similar parts of the said embodiment of the invention.

DESCRIPTION OF THE PREFERRED EMBODIMENT

The present invention is intended for use in a suitable hydraulic pressure chamber, such as is well known to those skilled in the art and may be employed in connection with the molds known as wet bag tooling in the manner hereinafter described. However, it is to be understood that the invention may also be employed with molds known as dry bag tooling.

Figure 1:
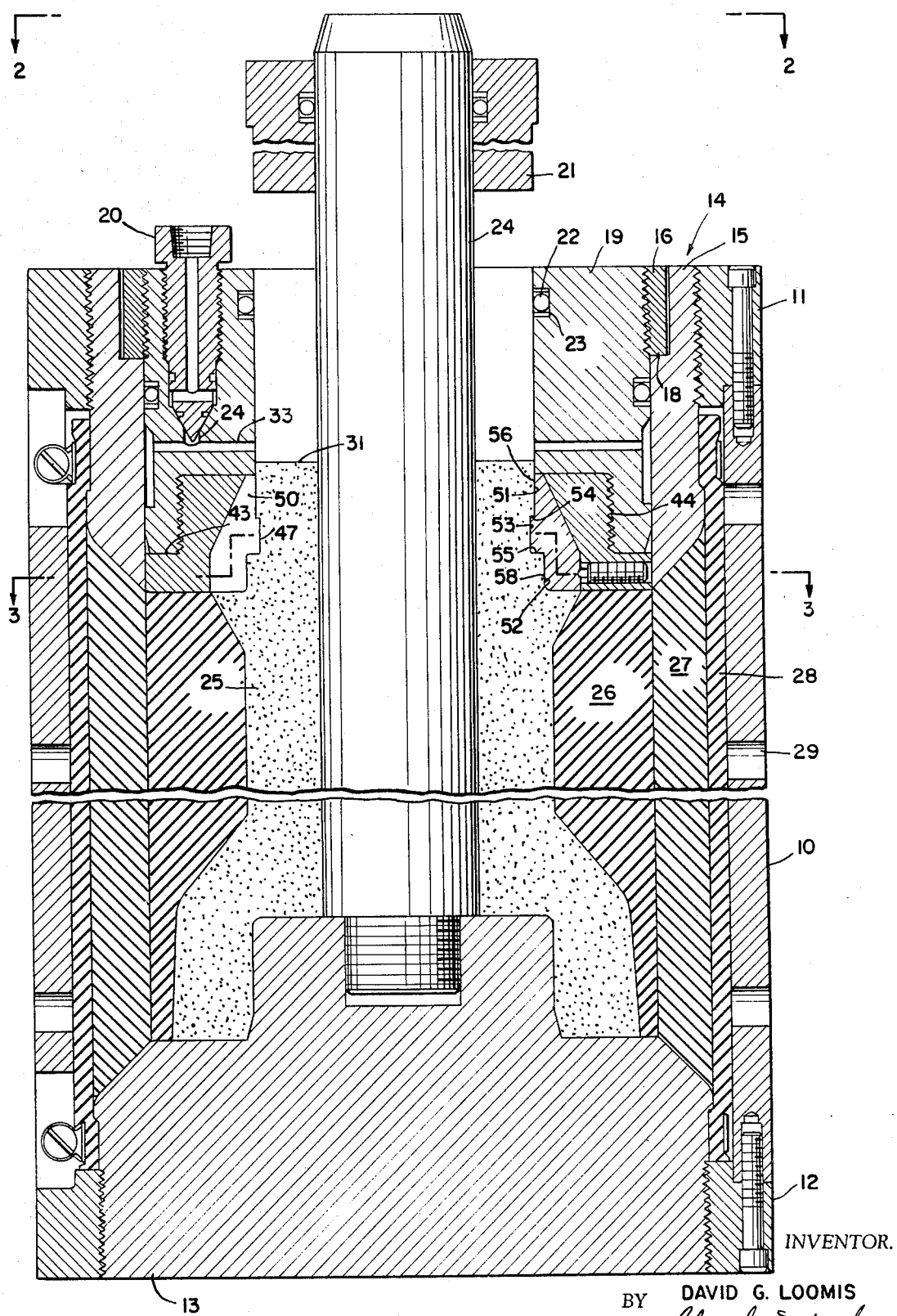
FIG. 1 is a fragmentary cross-sectional elevational view depicting one embodiment of the present invention.
Figure 2:
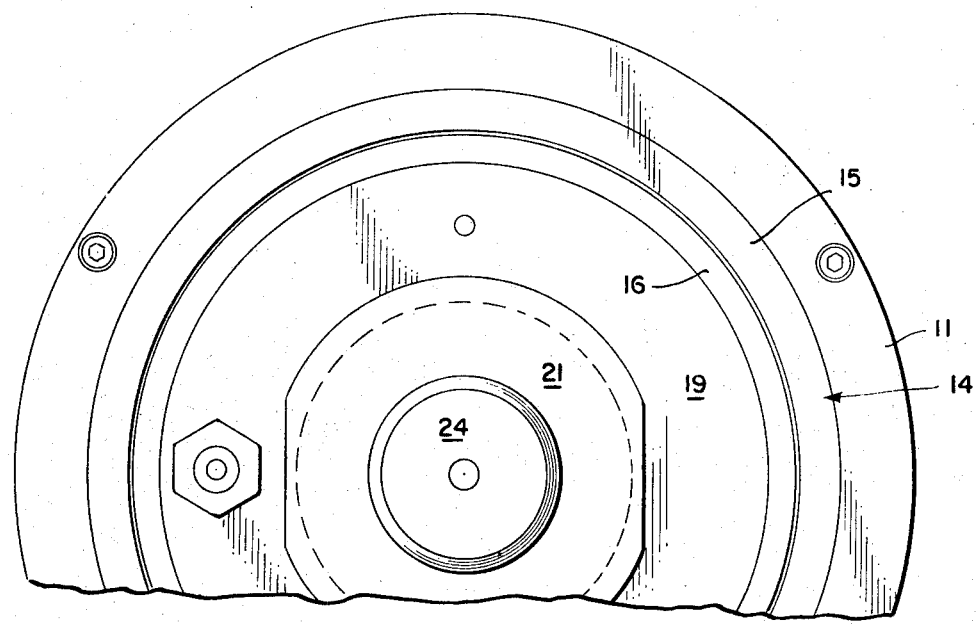
FIG. 2 is a fragmentary plan view taken about the line 2-2 of FIG. 1.
Figure 3:
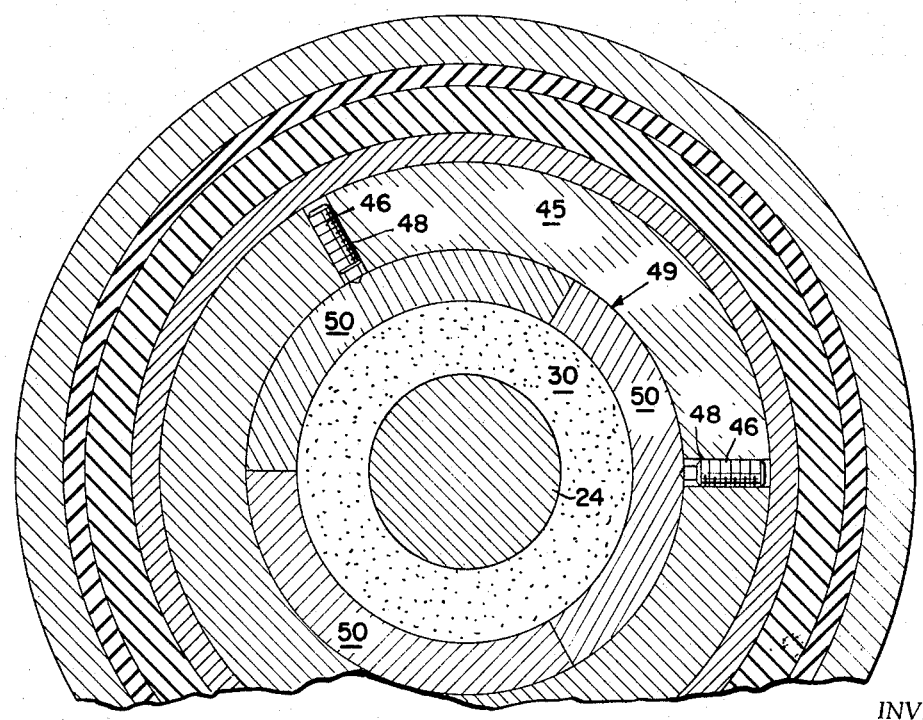
FIG. 3 is a cross-sectional view taken about the line 3-3 of FIG. 1.

As may be seen in FIGS. 1 and 2 of the accompanying drawings, one embodiment of the invention comprises a cylindrical housing 10 provided with upper and lower cover rings 11, 12 depending from said housing 10. The lower cover ring 12, is threadedly engaged with a suitable plug 13; and the upper cover ring 11 is threadedly engaged with a suitable plug, generally designated by the numeral 14.

The plug 14 includes a sleeve 15 threadedly engaged with the upper cover ring 11. A collar 16 is housed within the sleeve 15 and is abuttable against a shoulder 18 formed upon the internal periphery of the sleeve 15. Said collar 16 is also threadedly engaged with a generally cylindrical cap 19 which is provided with an air valve 20.

A hollow, cylindrical punch 21, composed of a hard material such as a suitable metal or other inflexible substance, is slidably engaged with the cap 19, the mating parts of these members being sealed by a suitable O-ring 22 disposed in an annular groove 23 formed on the internal periphery of the cap 19. The punch 21 is also slidably engaged with a cylindrical core pin 24 which surmounts the plug 13.

As may be seen in FIG. 1, the core pin 24 is surrounded by a region 25 adapted to receive a quantity of powdered or pelletized material intended to be compacted or pressed into the form of a pipe. Said region 25 is, in turn, enclosed in a generally cylindrical bag 26 composed of rubber or other suitably flexible material, bag 26 being, in turn, received within a suitable, flexible cylinder such as that formed by cylindrical bags 27 and 28, both of which are also composed of rubber or other suitably flexible material.

The housing 10 is provided with suitable apertures, such as aperture 29 through which a hydraulic pressure may be communicated by a fluid contactable with bag 28 and thence to bags 27 and 26, thereby exerting a hydraulic pressure upon the powdered or pelletized material received within the region 25.

Thus, it will be seen that such pressure can be employed to compact hollow cylindrical objects such as piping formed of clay or other ceramic material.

An important feature of the present invention resides in its provision for forming the end portions of such piping; and this feature may be better understood from a description of the steps employed in compacting a pipe, such as a ceramic sewer pipe, and various elements of the present invention associated with the formation of such end portions.

The aforesaid punch 21 may be removed or disposed in a raised or open position so as to permit filling region 25 with a suitable powdered or pelletized material 30 intended to be compacted into the form of a sewer pipe of conventional bell and spigot design. Said material 30 is loaded into region 25 until the material reaches the level indicated by the numeral 31.

During this loading operation, the above-described housing 10 and its contents may be disposed upon a jolter or other suitable vibratory mechanism so as to densify the said powdered or pelletized material 30 in the conventional manner.

Figure 4:
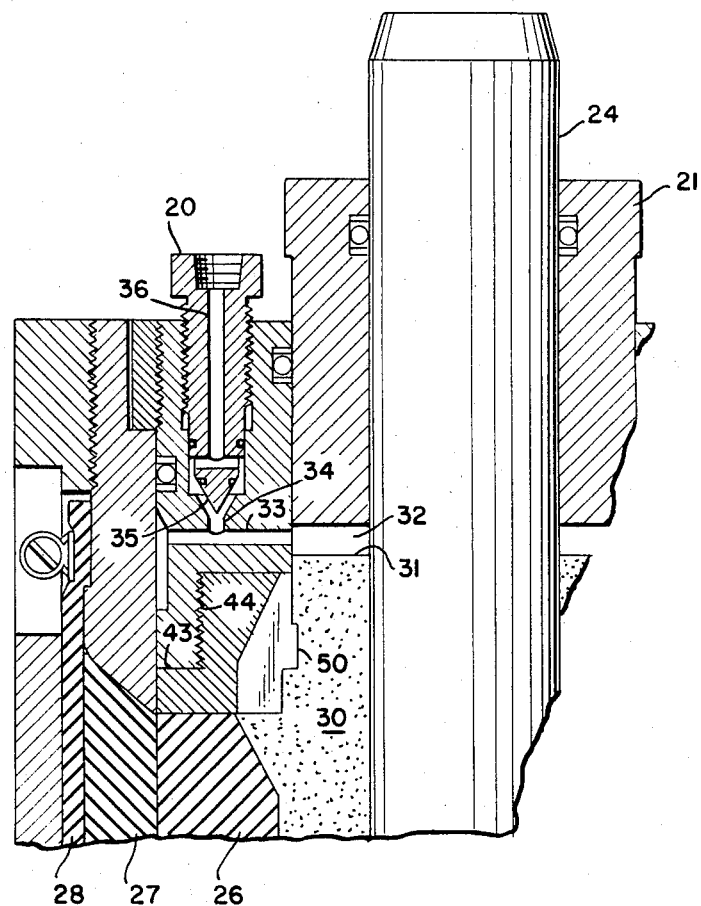
FIGS. 4, 5, 6, 7 and 8 are fragmentary cross-sectional elevations depicting various steps wherein the aforesaid embodiment of the present invention is employed in the production of pipe.

As shown in FIG. 4, after loading, as aforesaid, the punch 21 is disposed in a closed position with respect to the cap 19 and core pin 24 but said punch 21 is in a spaced relation with respect to the material 30, thereby defining a spaced region 32.

Said region 32 communicates with a radial channel 33 which, in turn, intersects with a vertical channel 34 communicating with the air valve 20.

After the punch 21 is disposed as depicted in FIG. 4, the air valve 20 is adjusted, as by partially unscrewing it, so as to cause it to occupy a spaced relation with respect to its seat 35, this disposition of the air valve 20 corresponding with an open position thereof wherein air may be communicated from the spaced region 32 through the channels 33, 34 and into the valve bore 36. Thus, the air valve 20 may be connected to a suitable pump or other exhaust means whereby air in spaced region 32 may be evacuated, as desired. So, also, any air or other gas or vapor which may be entrapped within the powdered or pelletized material 30 would, by virtue of such evacuation, tend to be drawn into the region 32 and thence exhausted therefrom.

Figure 5:
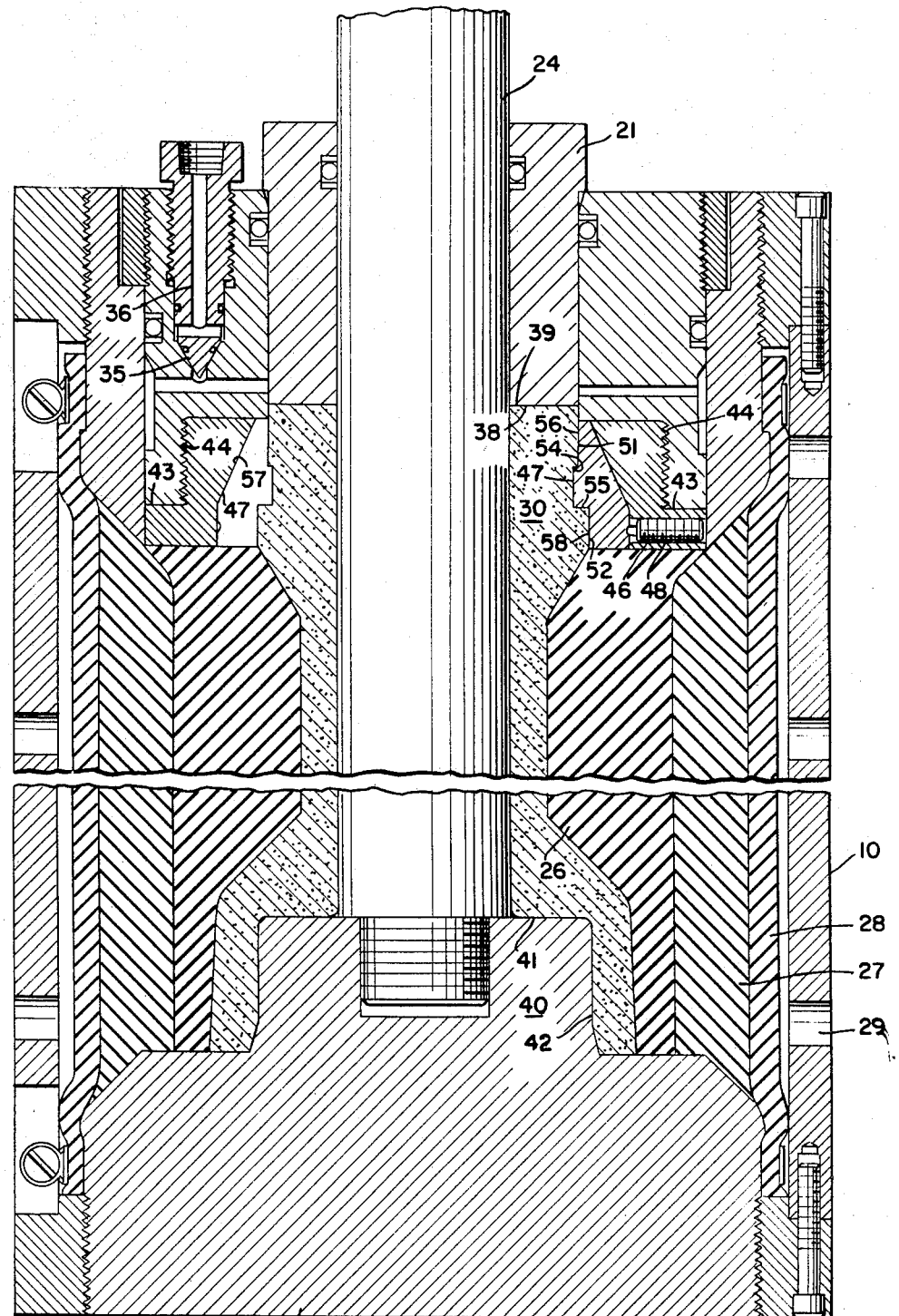

When such evacuation has been completed, the air valve 20 is tightened, as by screwing it into contact with its seat 35, thereby shutting the valve 20. Then, the complete assembly, i.e., the housing 10 and all of the above-described contents are disposed within a suitable hydraulic pressure chamber which is preferably of the type known in the art as an isostatic chamber. Such chamber is then closed and the hydraulic fluid therein subjected to a suitable pressure in the conventional manner, thereby transmitting such pressure through each aperture 29 to the bags, 28, 27, 26 disposed within the housing 10. The bags, 28, 27, 26, in turn, communicate the hydraulic pressure to the powdered or pelletized material 30, thereby pressing it to conform with the internal periphery of the bag 26 and the external periphery of the core pin 24, as is depicted in FIG. 5 of the drawings. In this way, the said material 30 is compacted to form a pipe as defined by the bag 26 and core pin 24.

It is also to be noted that at the same time that the said bags 28, 27, 26 are subjected to hydraulic pressure, that pressure also acts upon the punch 24 so as to depress it against the upper end of the material 30, thereby forming upon said pipe an end face 38, the surface of which conforms to the lower surface 39 of the punch 24. Thus, the precision with which the end face 38 is molded will be determined by the precision with which surface 39 is made; and in this way, by using a surface 39 machined within close tolerances, the end face 38 will be formed with correspondingly close tolerances.

A similar situation prevails at the lower end of the pipe where the powdered or pelletized material 30 is compacted against a precisely formed boss, generally designated by the numeral 40 and including an upper face 41 and circumferential periphery 42 which define the internal periphery of a bell-shaped end of said pipe. As in the case of end face 38, the boss 40 can be machined to close tolerances, thereby imparting correspondingly close tolerances to the internal periphery of the bell-shaped pipe end.

An important feature of the present invention resides in the means for imparting an annular groove 47 to the upper end or spigot of the pipe thus molded. Thus, the cylindrical cap 19 includes a base 43 having a threaded counterbore or recess 44. This recess 44 is threadedly engaged with an annular retaining ring 45 which is preferably provided with a plurality of pins or detents 46 threadedly engaged with radial apertures 48 provided in said retaining ring 45 at equal angular intervals.

The pins or detents 46 are abuttable against an annular die, generally designated by the numeral 49 and including a plurality of arcuate segments 50. The internal periphery of the annular die 49 includes an inclined, external, circumferential peripheral surface 37 abutting against an inclined seat 57 provided on the lower surface of the annular retaining ring 45.

The annular die 49 is also provided with upper and lower circumferential peripheral surfaces 51, 52 and an intermediate circumferential surface 53 having a reduced internal diameter corresponding with the depth of the annular groove to be imparted to the spigot. Said intermediate circumferential surface 53 also terminates in upper and lower horizontal shoulders 54, 55 which correspond with the sidewalls of the annular groove to be formed on the spigot.

It will be seen that the pins or detents 46 may be adjusted as desired so as to insure an accurate alignment of the die segments 50 and since said segments can be machined within close tolerances, a corresponding precision can be imparted to the annular groove 47 formed on the spigot. Similarly, the upper and lower surfaces 56, 58 adjacent to the groove 47 may also be molded with great precision corresponding to the accuracy with which the mating surfaces of the segments 50 are formed.

Figure 6:
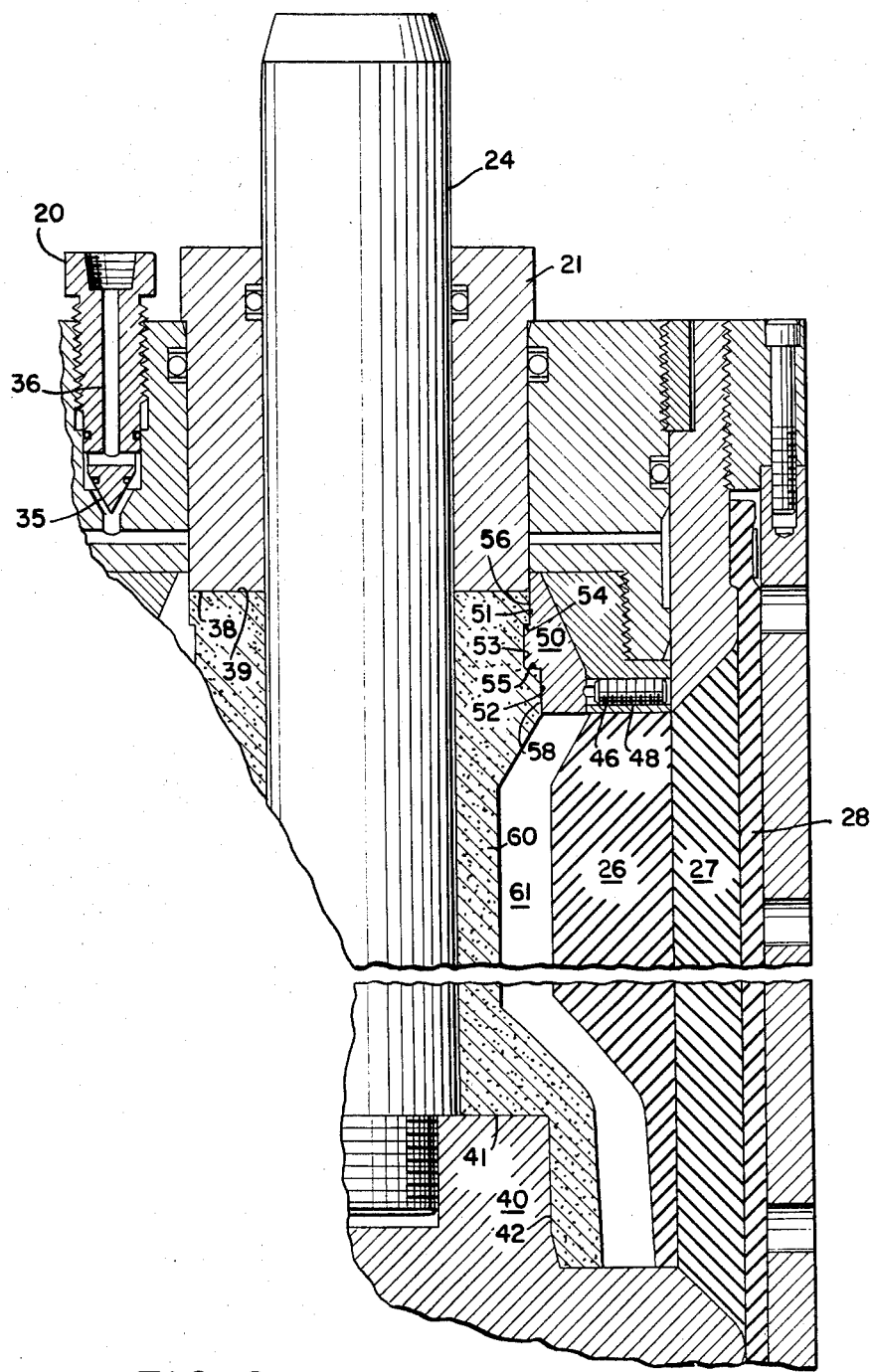

After the material 30 has been compacted so as to assume the form of a bell and spigot pipe as aforesaid, the hydraulic pressure in the chamber is reduced so as to permit the chamber to be opened and the housing 10 to be opened and the housing 10 to be removed therefrom. Then the air valve 20 is unscrewed so as to break the vacuum within the mold, thereby permitting the bags 26, 27, 28 to return to the position which they occupied prior to their subjection to the aforesaid hydraulic pressure, as shown in FIG. 6. The pipe 60 formed by said pressure, retains its compacted shape, thereby determining a spaced region 61 surrounding the circumferential periphery of the portion of the pipe 60 below its spigot end. Thus, the innermost bag 26 is released from contact with the pipe 60 when the hydraulic pressure is released.

Figure 7:
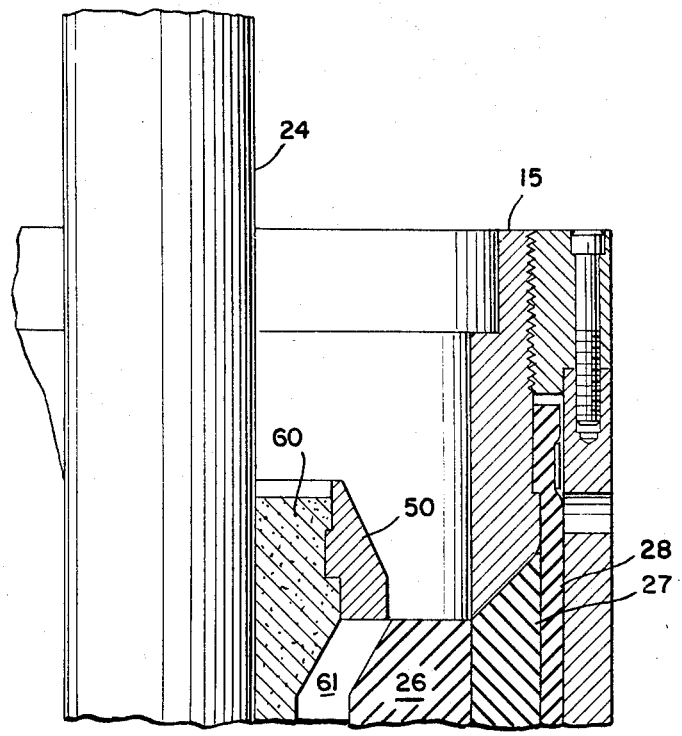
Figure 8:
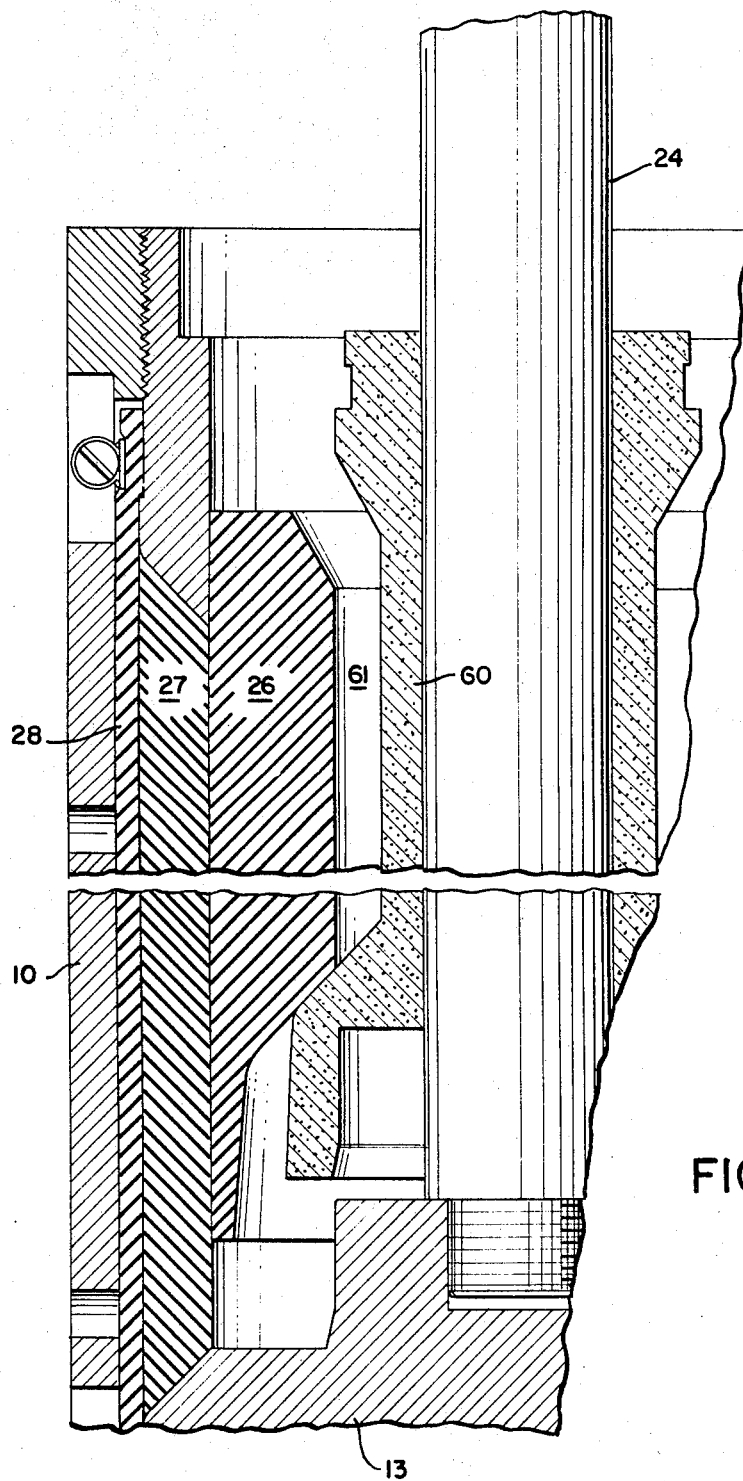

The mold may then be opened by removing the punch 21, cap 19, collar 16, sleeve 15, the disposition of the mold with these parts removed being depicted in FIG. 7. Then, the retaining ring 45 and segments 50 may also be removed. As depicted in FIG. 8, this arrangement permits the compacted pipe 60 to be raised so that its bell end abuts against the lower inclined surface 65 of the bag 26, thereby urging said bag 26 to withdraw from the mold together with the pipe 60. When such withdrawal is accomplished, the pipe 60 can be separated from the bag 26 and the mold be reassembled to assume the disposition depicted in FIG. 1, wherein the aforesaid operations may be repeated to form further bell and spigot piping, as desired. It may be added that in the course of such withdrawal, the pipe 60 can be separated from the core pin while the latter is within the mold or said core pin can be removed with the pipe 60 and thereafter separated therefrom, as is convenient.

From the foregoing, it will be seen that the objects of the invention have been achieved in a simple but ingenious manner. Thus, the annular groove, formed on the external circumferential periphery of the spigot, may be made very precisely, thereby permitting such annular groove to serve as an O-ring groove constituting part of a bell and spigot joint. So, also, since the bell, as well as the spigot portions of the joint, may be formed as described above, within close tolerances, the seal accomplished by such joint will be highly efficient and the joint itself may be of minimum size, i.e., the clearance between the adjacent spigot and bell in such a joint may be minimized by reason of the great precision of manufacture attainable by this invention.

It will also be seen that both internal and external surfaces of such bell and spigot portions of pipe may be produced with a smooth finish and, by virtue of the aforesaid precision of manufacture, will require little or no subsequent finishing. Moreover, by reason of the above-described advantages, the production of piping by this invention is attendant with economies not available in conventional procedures and apparatus.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

1. In a mold disposable within a hydraulic fluid and including a housing provided with at least one aperture for reception of said fluid, opposing end cover means accommodating therebetween a dry powdered material intended to be pressed into cylindrical form and flexible means communicating with said fluid and urging said powdered material to assume said cylindrical form when said fluid is subjected to pressure, the combination comprising:
  a. an annular die including a plurality of arcuate segments communicating with the external periphery of said powdered material and having an internal diameter which is smaller than the external diameter of adjacent portions of said powdered material, thereby forming an annular groove in said powdered material;
  b. means for supporting said annular die in circular alignment;
  c. said supporting means depending from said cover means;
  d. said supporting means including:
    i. an annular retaining ring provided with an inclined seat formed on the lower surface thereof and a plurality of radially disposed apertures;
    ii. a plurality of pins adjustably secured within said apertures;
    iii. said pins being abuttable against the arcuate segments to urge them into circular alignment;
    iv. said arcuate segments also being abuttable against said inclined seat.

2. In a device according to claim 1,
  a. said end cover means including a cap provided with a base having a recess;
  b. said annular retaining ring being engaged with the periphery of said recess.

3. In a device according to claim 2, said end cover means including:
  a. an axial aperture;
  b. a punch slidably received within said axial aperture;
  c. a portion of said punch being communicable with said hydraulic fluid, whereby said punch is urged into the mold when such fluid is subjected to pressure;
  d. another portion of said punch being abuttable against said powdered material, whereby said pressure is transmissable to an end surface of said powdered material.